INVENTOR.
Harold F. Pitcairn
BY
ATTORNEYS

Patented Apr. 16, 1935

1,997,600

UNITED STATES PATENT OFFICE

1,997,600

AIRCRAFT HAVING AIR-ROTATED WINGS

Harold F. Pitcairn, Bryn Athyn, Pa., assignor to Autogiro Company of America, Willow Grove, Pa., a corporation of Delaware Application October 20, 1932, Serial No. 638,701

8 Claims. (Cl. 244—19)

This invention relates to aircraft having air-rotated wings, and is particularly concerned with the construction, mounting, and operation of the sustaining rotor of such an aircraft. The nature of the present invention, which lies in the field of autorotative winged machines, will be best understood if there be first a brief discussion of some of the major differences between this general type of machine and the general type known as the helicopter.

Aircraft of the rotative wing type, as first exemplified in operative form in patent to Juan de la Cierva No. 1,590,497, have been constructed to overcome certain difficulties inherent in the numerous theoretical concepts of helicopters, which latter were essentially incapable of controlled flight or practical operation. Among the many problems which were as a group overcome by the invention of said patent, several major difficulties might be mentioned, any one of which was, prior to the introduction of said invention, sufficient to render impossible the practical evolution or operation of a rotative wing machine of any type. Such major difficulties might be briefly mentioned, as follows:

(1) The employment of a direct-lifting propeller or air screw, power-driven in flight, produced a reactive or torque effect upon the body of the machine which was apparently incapable of being practically controlled or accurately compensated for.

(2) The use of such a helicopter lifting propeller to effect translational flight as well as ascent and descent was not only inefficient as necessitating tilting of the body to various angles to obtain a lateral component of the lift thrust, but was also impractical from the standpoint of stability, balance, control and maneuverability.

(3) The size, diameter, and weight of any rigid, rotating propeller theoretically capable of producing direct lift or helicopteral flight were so great as to introduce not only almost insuperable structural problems but also an effect of gyroscopic precession which, if not accommodated as by some flexible means, was practically uncontrollable.

(4) Furthermore, such a lifting unit, if the machine were to have any appreciable forward or translational speed, produced a differential lift, or dissymmetry of forces, due to the difference of relative air speed between the blade or wing advancing, in its rotation, in the direction of translational flight, and the blade or wing moving backward, in its rotation, with respect to the line of flight; such differential lift being sufficient to render controlled flight operation impracticable.

(5) The high pitch setting or incidence of such helicopter wings or air screws necessary to obtain direct vertical lift with the power available was such that upon failure of the power, the propeller, even assuming that it were then left free to turn, would slow up, or would tend to rotate, "windmill" fashion, in the opposite direction, resulting in damage to the propeller or, more likely, destruction of the machine.

(6) Some efforts were made to use helicopter blades of thin, flexible sheets, in an effort to overcome one or another of the foregoing difficulties, but these were inherently incapable of maintaining either an operative aerofoil cross section or an operative position under all flight conditions, and for these and other reasons have not been workable. The same is true of numerous other expedients.

As is now generally recognized, the above, and other difficulties were, as an entirety or combined problem, met by the aircraft of said patent, in which the flight and propulsion were effected by an engine and propeller, after the manner of an aeroplane, and in which the sustension was effected by a system of wings or aerofoils which were mounted so as to be freely rotatable in flight and positioned so as to be continuously rotated in flight by the relative flight wind or air pressure, which, encountering the rotor (considered as a whole) somewhat from below produced an aerodynamic action, once the wings were set in rotation, which gave not only a lifting effect due to the rotational and translational movement of the wings, but also a component of lift, as to each wing, in a forward direction in the circle of rotation, so as to maintain the wings in rapid rotation as long as the weight of the machine was suspended from said wings; and further in which the wings were pivotally mounted so that their aerodynamic angle of attack might vary. Thus, in that construction, aerodynamic action was utilized to effect rotation, to produce lift, to overcome gyroscopic precession, and to obviate dissymmetry of lift. The construction was thus a radical departure from the helicopter idea and obviously overcame all the aforementioned problems.

In general, the experience gained since the advent of the air rotative winged machine shown in said Patent No. 1,590,497, has proved in daily practice or operation not only the fact that the said major difficulties were overcome, but also a number of other facts regarding the structure and operation of such aircraft.

For example, experience has indicated what is the mean or average position of the wings of the rotor on their pivots; or, more specifically, the average "coning" angle of the wings when they are individually pivoted by means of horizontal pivots as shown in said patent. In other words, as each wing makes one cycle it swings or oscillates on its pivot to decrease its aerodynamic angle of attack as it advances in the line of flight, and swings on its pivot to increase its aerodynamic angle of attack as it retreats with relation to the line of flight of the craft; but the average pivotal position of the wing tends to be (with the type of pivot referred to) somewhat upwardly from a true flat plane perpendicular to the axis of rotation, that is, a position in which the rotor may be considered as slightly coned. With other pivot arrangements, later evolved, the average position of the wing on its pivot may be different, but in all the forms and modifications of the autorotative-wing machine so far developed the pivotal movement of the wings accomplishes a variation in aerodynamic angle of attack which is apparently essential to the overcoming of the several difficulties enumerated, as well as other difficulties which need not here be mentioned.

It has also been found that there is an approximately equal and opposite tendency, at any given moment, in diametrically opposite wings or blades. While this tendency is not exactly equal, nevertheless it approaches an approximation. Thus, with the type of pivot here discussed, when one blade is at one extreme of its pivotal movement, the diametrically opposite blade tends to be approximately at the opposite extreme of its pivotal movement.

It has further been found that in compensating for differential lift, during forward flight, an advancing blade does not rise to its highest point (approximating its minimum aerodynamic angle of attack) by the time it reaches full forward position relative to the path of flight, nor does the diametrically opposite retreating blade reach its lowest point (approximating its maximum aerodynamic angle of attack) at the rearmost position. In fact, due at least partly to a lag in the pivotal or swinging movement of the wings or blades, it is found that the advancing blade (pivoted as before described) tends to reach its highest point of pivotal movement after it has traversed its full forward path and has passed rearwardly about 45° from its forward position, in the circle of rotation; and a diametrically opposite retreating blade tends to reach its lowest position of pivotation at a point approximately 45° past the rearmost position of its rotation.

I have, from the foregoing and other factors, found it possible to simplify the mounting of the wings and attain certain other advantages which might here be briefly mentioned.

Primarily, the present invention contemplates eliminating one or more individual pivots for each of the wings or blades of the rotor (such as heretofore employed in said patent or as employed in Patent No. 1,859,584), and employing a more or less solid or rigid joining together of a plurality of rotor blades or wings, to form, as it were, an approximately rigid rotational disc, or, more preferably "cone" of blades; and the mounting of the set or group of wings or blades, as a unit, by means which will permit such unit to rock as an entirety in any plane containing the general rotational axis, as for example by means of a universal joint in the axis structure itself.

The invention further contemplates the relative positioning of the wings of the rotor in such a way that they are initially located or positioned at their average relatively coned angle; the blades being further preferably set at a very slight positive incidence or pitch (as distinguished from aerodynamic angle of attack) with respect to a plane perpendicular to the axis of rotation. I do not, however, specifically claim herein the positive lift incidence setting of the air-rotated blades, as the same is described and claimed in the copending application of Juan de la Cierva, Serial No. 500,064, filed December 4th, 1930, issued as Patent No. 1,947,901, on February 20, 1934.

The invention further involves the provision of means to limit, control or restrict the degree of pivotal movement of the rotor unit; and further the location of the pivotal mounting or universal joint at a point below the general plane of the rotor blades.

It is also contemplated that, since the invention provides more stable, or predetermined, angles and positions of the blades during their operation, especially when they are just being started up, or when they are coming to rest, the clearances between the blades and the other parts of the craft, such as propeller and rudder, may be reduced, and thus the rotor as a whole may be somewhat lowered, that is, mounted closer to the body, whereby the center of gravity of the craft as a whole may be somewhat dropped as compared with such aircraft as heretofore constructed; whereby it is possible to improve stability and control.

The invention also contemplates the minimization or total elimination of interblade connections or blade droop supporting cables, which have been found desirable with certain types of pivotal arrangements.

How I attain the foregoing, together with such other objects and advantages as are incident to the invention, will be clear from the following description taken together with the accompanying drawings, in which drawings—

Figure 1:
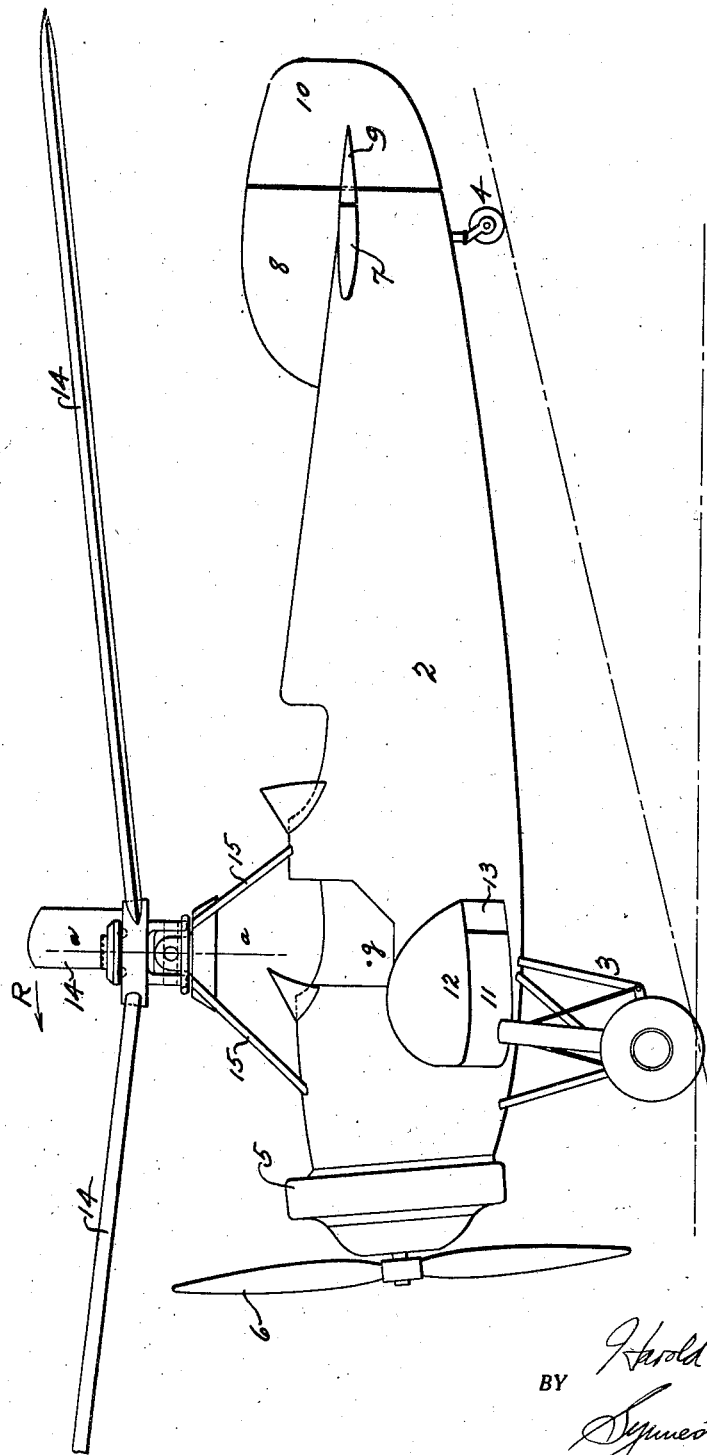
Figure 1 is a side elevational view of an aircraft embodying the present invention, showing a three-winged rotative sustaining unit and its mounting structure in general.

By reference first to Figure 1 there is seen an aircraft having a body 2; with undercarriage 3, 4; engine and propeller 5, 6; stabilizer 7, fin 8, elevator 9, and rudder 10; small fixed wings 11 which may carry fixed stabilizing fins 12 and controllable ailerons 13; and a main sustaining system, or rotor, of freely airdriven wings 14, three of which are shown although the number thereof may vary.

The autorotative or aerodynamically-driven wing system is secured above the body of the aircraft by means of a pylon made up of struts or the like 15; the rotor being mounted thereon, in accordance with Figures 1 to 3, as follows:

Adjacent the top of the pylon legs is formed or secured an apex member 16 carrying a pair of upwardly extending ears 17. Between said ears is rockingly mounted a block 18 by means of transverse pivots 19. At right angles to said pivots are pivot pins 20 serving to pivotally mount a pair of ears 21 which extend downwardly from the base-plate 22 of the non-rotative shaft 23. A universal joint for the rotor unit is thus provided.

The hub 24 of the rotor, in which the root ends of the blades or wings 14 are secured, is mounted for normally free rotation about the shaft 23 as an axis, rotor-supporting and lift-thrust bearings 25 and 26 being provided for that purpose. The balls of bearing 25 may ride in a race provided on the plate 22, while those of the bearing 26 may transmit the lift of the rotor to the shaft by means of member 27; and the assembly is readily retained as by a locknut 28. A ring 29 may be secured to the bottom of lugs 21, having normally a clearance with respect to the apex box 16, but serving as a limiting stop as against extreme angular tilting of the rotor on its universal joint, in any direction.

Figure 2:
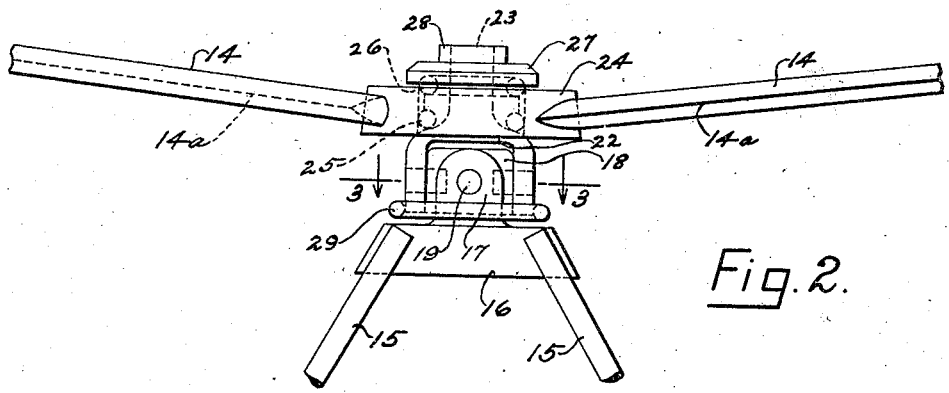
Figure 2 is an enlarged elevational view of the mounting structure with portions of the two proximate wings.
Figure 3:
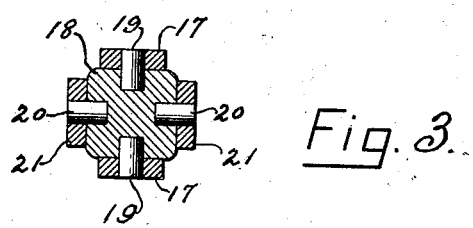
Figure 3 is a cross sectional detail, on the line 3—3 of Figure 2.

As seen in Figure 2 from the position of the trailing edge 14a, each wing is set at a slightly positive lift incidence with respect to a general plane perpendicular to the axis of rotation, so as to be within the most efficient, autorotationally-operative, incidence range set out in said copending application Serial No. 500,064, and the blades are socketed or secured in the hub 24 at an upwardly coned angle which is approximately the average angle which the blades would normally tend to assume under the action of the lift and centrifugal forces during rotation. These blades or wings are made sufficiently stiff to maintain not only their operative position, both when in flight and when at rest, but also their proper aeroform shape or contour.

Figure 4:
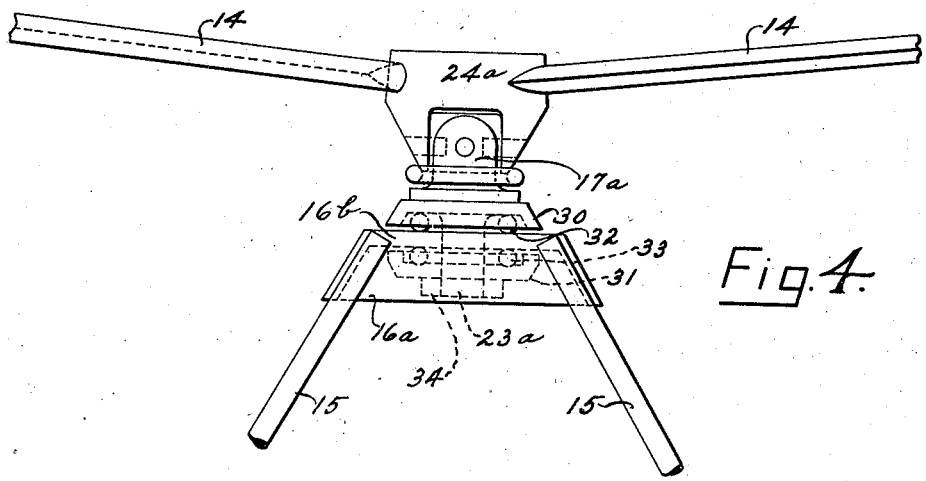
Figure 4 is a view similar to Figure 2 but illustrating a modified mounting structure.

In the embodiment shown in Figure 4, the pylon legs 15 and rotor blades 14 are as before described, but the apex member 16a in this instance carries a bearing plate 16b and is apertured to receive a rotative shaft 23a. The rotor hub 24a is mounted by a universal joint similar to that above described, but in this instance the universal joint itself rotates with the rotor, the lugs 17a thereof being mounted upon the rotative shaft 23a, which latter also carries upper and lower bearing seats 30 and 31 for the ball bearings 32, 33, which ride, respectively, above and below the top plate 16b of the apex member. This assembly is ultimately secured in place by the nut or retainer 34, it being evident that this arrangement, as well as the arrangement of Figure 2, is very readily assembled and taken apart, and that in either form of construction the rotor may be readily removed, as for repairs or adjustment, by the removal of the final assembly nut.

In operation (again referring to Figure 1), assuming the machine to be descending in substantially vertical descent on an even keel, with the axis a—a substantially vertical and the lift line relatively close to the center of gravity g of the craft, the rotor turns in the direction of the arrow R, and since there is in this condition of flight (that is, vertical descent) substantially no difference in the forces acting on the blades at different angular positions about their rotational axis, the rotor axis remains substantially at its neutral or mid-position on its universal joint (as shown in Figure 1). In forward flight, however, owing to difference in relative air speed of the wings on the side advancing in the direction of the line of flight (the far side in Figure 1) and the wings on the side where they are retreating with respect to the line of flight (the near side in Figure 1), the wings will tend to rise as they advance forwardly in their rotation and will tend to fall as they move rearwardly, and the rotor as a whole will tip to a position of substantial equilibrium, the high point of the rotor (considered as a disc) being approximately at a point 45° angularly to the left from the nose of the machine, and the low point of the disc being at a point approximately 45° angularly to the right from the tail of the machine.

Thus, with the blades initially mounted in their hub at positions which approximate the average positions which they would normally assume if individually pivoted; and with the hub then mounted for universal tilting of the rotor as a whole, positions of approximate balance and stability are obtained, in all styles of flight from full forward flight to vertical descent, and this without the necessity of individual pivots for the several wings and individual blade-swinging control devices, droop supports and the like, which were heretofore employed. As a matter of fact, when in flight, each blade or wing acts, by means of the common hub, on all the other blades or wings of the rotor, in the sense that a tendency toward an excessive upward or downward swinging of one of the wings is controlled by the particular tendencies of the other wings existing at the same moment. Thus the hub, as a part of the common mounting mechanism for all the wings, constitutes a means by which, for any given flight condition, all the wings are constrained to follow a substantially similar variation in aerodynamic angle of attack, in compensating for differential lift and the like.

The spacing between the limiting ring 29 and the apex structure 16 (Figure 2) is preferably such that said ring does not come into contact with said apex member in normal flight operation except possibly in very gusty air; the aerodynamic action of the several wings of the rotor producing tilting of the rotor only within a predetermined range which is dependent upon the differential lift produced at top forward speed of the machine. When the craft is at rest, however, or when the rotor is being started or just coming to a stop, the ring 29 acts as a stop device to prevent the rotor from tipping excessively in any direction and/or from being blown by wind gusts, on the ground, in such a way that the blades would foul the propeller or the rudder.

The stability of the rotor, in flight, is aided by virtue of the fact that the center of the universal joint is below the center of intersection of the wings. This does not, however, interfere with or prevent the rotor from "following" the maneuvers of the machine as determined by the control surfaces 9, 10 and 13; since, in the first place, changes in the attitude of the craft take place about the center of gravity of the craft as a center, and in the second place, the lift of the rotor tends to hold the center of intersection of the blades, the center of the universal joint, and the center of gravity of the craft, in a straight line.

As heretofore pointed out, a rigid rotor having its axis fixed with respect to the craft would produce gyroscopic precession at right angles to any intended direction of maneuver. With the present invention, however, gyroscopic effect is accommodated by the pivotal mounting and tends to be corrected by the aerodynamic action of the rotor in "following" the maneuvers of the machine.

As to simplicity of structure, ease of manufacture and assembly, ruggedness in service, and freedom from any possible binding or failure to respond to the movements imposed upon the wings, the simple and compact universal joint structure herein disclosed is quite advantageous; the machining of the parts necessary for such a joint being quite simple; and the arrangement of the rotor hub bearings either inside the hub (as in Figure 2) or adjacent the pylon apex (as in Figure 4) producing a compact structure, in association with the universal joint, which presents relatively little head resistance or parasite drag.

I claim:—

1. In an aircraft, a sustaining rotor comprising an upright normally freely rotatable axis or hub member, a plurality of blades or wings secured thereto at such incidence that they will be aerodynamically rotated in all styles of flight, and means providing for some degree of tipping of said axis or hub member in every direction, said last mentioned means including a universal joint for mounting said hub member on the aircraft, the longitudinal axes of said blades or wings being arranged to substantially intersect at a point above the center of the universal joint.

2. In an aircraft, a sustaining rotor comprising a plurality of wings positioned for autorotative action by the relative air-flow in flight, a common axis structure on which said wings are pivoted for rocking as a unit, and means for rotatively mounting said axis structure including supporting struts, an apex structure joining said struts, and thrust bearing means for supporting said axis structure located in said apex structure.

3. In an aircraft, means of forward propulsion including a propeller, and means of sustension comprising a rotor made up of at least three wings or blades positioned to be normally aerodynamically turned by the relative air-flow in flight, a generally upright axis structure about which said wings are arranged to rotate, by which arrangement said wings are subject to lift and centrifugal forces and are in forward flight subject to differential lift effects at opposite sides of the craft, mounting means for the wings securing them at a relatively coned angle which approximates the average coning angle which the wings tend to assume under the action of centrifugal and lift forces, and pivot means providing for coordinated variation in the aerodynamic angle of attack of the several wings to substantially obviate differential lift effects.

4. In an aircraft, means of forward propulsion including a propeller, and means of sustension comprising a rotor made up of a plurality of wings or blades positioned to be normally aerodynamically turned by the relative air-flow in flight, a generally upright axis structure about which said wings are arranged to rotate, by which arrangement said wings are subject to lift and centrifugal forces and are in forward flight subject to differential lift effects at opposite sides of the craft, mounting means for the wings securing them at a relatively coned angle which approximates the average coning angle which the wings tend to assume under the action of centrifugal and lift forces, pivot means providing for variation in the aerodynamic angle of attack to substantially obviate differential lift effects, said rotor being mounted relatively close to the body of the craft but with some clearance over the propeller so as to lower the center of gravity of the craft as a whole, and means limiting the movement of the wings on the pivot means so as to prevent fouling of the propeller and rotor.

5. For an aircraft, a normally freely rotative sustaining rotor comprising three wings or blades positioned at an autorotational incidence for aerodynamic rotation under the action of the relative air-flow in flight, a generally upright axis structure about which said wings are arranged in approximately equispaced and substantially radial locations, by which arrangement said wings are subject to lift and centrifugal forces and are in forward flight subject to differential lift effects at opposite sides of the craft, hub mechanism for the wings to which they are secured, and means mounting the hub and providing rocking of said hub in all directions from its normal upright position whereby all said wings may rock as a unit to relieve the differential lift effects.

6. For an aircraft, a normally freely rotative sustaining rotor comprising at least three wings or blades positioned at an autorotational incidence for aerodynamic rotation under the action of the relative air-flow in flight, a generally upright axis structure about which said wings are arranged in approximately equispaced and substantially radial locations, by which arrangement said wings are subject to lift and centrifugal forces and are in forward flight subject to differential lift effects at opposite sides of the craft, hub mechanism for the wings to which they are secured at a relatively coned angle which approximates the average coning angle which the wings tend to assume under the action of centrifugal and lift forces, and means mounting the hub and providing for automatic rocking of said hub in all directions from its normal upright position, whereby all said wings may rock as a unit to relieve the differential lift effects.

7. For an aircraft, a normally freely rotative sustaining rotor comprising at least three wings or blades positioned at an autorotational incidence for aerodynamic rotation under the action of the relative air-flow in flight, a generally upright axis structure about which said wings are arranged in approximately equispaced and substantially radial locations, by which arrangement said wings are subject to lift and centrifugal forces and are in forward flight subject to differential lift effects at opposite sides of the craft, hub mechanism for the wings to which they are secured at a relatively coned angle which approximates the average coning angle which the wings tend to assume under the action of centrifugal and lift forces, means mounting the hub and providing for automatic rocking of said hub in all directions from its normal upright position, whereby all said wings may rock as a unit to relieve the differential lift effects, and restrictive means tending to limit the extent of such rocking movements.

8. In an aircraft having means of forward propulsion including a propeller, means of sustension comprising a rotor made up of a plurality of wings or blades positioned to be normally aerodynamically turned by the relative air-flow in flight, a generally upright axis structure about which said wings are arranged to rotate, by which arrangement said wings are subject to lift and centrifugal forces and are, during forward flight as produced by said propeller, subject to differential lift effects at opposite sides of the craft, mounting means for the wings securing them at a relatively coned angle which approximates the average coning angle which the wings tend to assume under the action of centrifugal and lift forces, and pivot means providing for variation in the aerodynamic angle of attack to substantially obviate differential lift effects, the center of the rotor being mounted relatively close to the body of the craft so as to lower the center of gravity of the craft as a whole but with a clearance of the wings over the propeller approximating the normal clearance by virtue of their upwardly coned angle.

HAROLD F. PITCAIRN.